(12) United States Patent
Volkerink et al.

(10) Patent No.: US 11,284,228 B2
(45) Date of Patent: Mar. 22, 2022

(54) WIRELESS AUTONOMOUS AGENT PLATFORM

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/019,694

(22) Filed: Sep. 14, 2020

(65) Prior Publication Data

US 2021/0084457 A1 Mar. 18, 2021

Related U.S. Application Data

(60) Provisional application No. 62/900,377, filed on Sep. 13, 2019.

(51) Int. Cl.
*H04W 4/35* (2018.01)
*H04W 4/029* (2018.01)
(Continued)

(52) U.S. Cl.
CPC ............. *H04W 4/35* (2018.02); *H04W 4/029* (2018.02); *H04W 4/38* (2018.02);
(Continued)

(58) Field of Classification Search
CPC ........ H04W 4/30; H04W 84/18; H04W 84/20
See application file for complete search history.

(56) References Cited

U.S. PATENT DOCUMENTS 6,614,392 B2  9/2003  Howard
7,797,367 B1* 9/2010  Gelvin .................... H04L 67/12
                                              709/200

(Continued)

FOREIGN PATENT DOCUMENTS

CA  3061878 A1  11/2018

OTHER PUBLICATIONS

Luo et al. "Self-securing Ad Hoc Wireless Networks." Proceedings of the Seventh International Symposium on Computers and Communications (ISCC'02). 1530-1346/02, 2002, IEEE Computer Society.

(Continued)

*Primary Examiner* — Wen W Huang

(57) ABSTRACT

A plurality of tape agents includes an autonomous master wireless tape agent. The autonomous wireless tape agent includes a first wireless communications interface type operative to communicate over a wireless communications link with an associated secondary wireless agent. The autonomous master wireless tape agent corresponds to a child node in a wireless agent hierarchy. The secondary wireless agent includes a second wireless communications interface type that has a longer wireless communications range than a wireless communications range of the first wireless communications interface type. The secondary wireless agent corresponds to a parent node in the wireless agent hierarchy. The master wireless tape agent governs the wireless communications link and traffic between the master wireless tape agent and the secondary wireless agent. The master wireless tape agent is operative to schedule a designated time slot for each secondary wireless agent transmission. The secondary wireless agent is operative to synchronize its transmit and receive timing with that of the master wireless tape agent and respond to requests received from the master wireless tape agent.

22 Claims, 7 Drawing Sheets

(51) Int. Cl.
  *H04W 4/38*  (2018.01)
  *H04W 52/02*  (2009.01)
  *H04W 72/04*  (2009.01)
  *H04W 56/00*  (2009.01)
  *H04W 88/06*  (2009.01)
  *H04W 84/20*  (2009.01)
  *H04W 88/04*  (2009.01)

(52) U.S. Cl.
  CPC ..... *H04W 52/0229* (2013.01); *H04W 56/001* (2013.01); *H04W 72/0446* (2013.01); *H04W 84/20* (2013.01); *H04W 88/04* (2013.01); *H04W 88/06* (2013.01)

(56) References Cited

U.S. PATENT DOCUMENTS

| | | |
|---|---|---|
| 9,565,622 B2 | 2/2017 | Chikkappa et al. |
| 9,773,220 B2 | 9/2017 | Blanchard et al. |
| 9,794,753 B1* | 10/2017 | Stitt ................. H04B 17/27 |
| 10,123,294 B2 | 11/2018 | Thompson et al. |
| 10,313,925 B2 | 6/2019 | Jones et al. |
| 10,379,842 B2 | 8/2019 | Malladi et al. |
| 10,595,274 B2 | 3/2020 | Khaled et al. |
| 11,003,978 B2 | 5/2021 | Khoche |
| 2005/0063313 A1 | 5/2005 | Nanavat et al. |
| 2007/0049291 A1 | 3/2007 | Kim et al. |
| 2009/0290511 A1 | 11/2009 | Budampati et al. |
| 2010/0082870 A1 | 4/2010 | Tokuhara |
| 2011/0035491 A1 | 2/2011 | Gelvin et al. |
| 2013/0002044 A1 | 1/2013 | Takehara et al. |
| 2013/0272180 A1 | 10/2013 | Hiremath et al. |
| 2015/0180971 A1 | 6/2015 | Varney et al. |
| 2015/0249482 A1* | 9/2015 | Czaja ................. H04W 4/38 455/41.1 |
| 2015/0349917 A1 | 12/2015 | Skaaksrud |
| 2016/0233927 A1 | 8/2016 | Wu |
| 2017/0238035 A1 | 8/2017 | Perez |
| 2017/0280351 A1 | 9/2017 | Skaaksrud |
| 2018/0084371 A1 | 3/2018 | Scagnol et al. |
| 2018/0139726 A1 | 5/2018 | Choi et al. |
| 2018/0165568 A1 | 6/2018 | Khoche |
| 2018/0279179 A1 | 9/2018 | Norlen et al. |
| 2018/0293513 A1 | 10/2018 | Sugaya |
| 2018/0321356 A1 | 11/2018 | Kulkarni et al. |
| 2018/0365635 A1 | 12/2018 | Lucrecio et al. |
| 2019/0113632 A1 | 4/2019 | Lucrecio et al. |
| 2019/0116091 A1 | 4/2019 | Bijavara Aswathanarayana Rao et al. |
| 2019/0138534 A1 | 5/2019 | Bernat et al. |
| 2019/0158606 A1 | 5/2019 | Guim Bernat et al. |
| 2019/0222055 A1 | 7/2019 | Khoche et al. |
| 2019/0285724 A1 | 9/2019 | Meadow |
| 2019/0362215 A1 | 11/2019 | Khoche |
| 2019/0370624 A1* | 12/2019 | Khoche ................. B65C 9/1869 |

OTHER PUBLICATIONS

Pagani et al. "Resource sharing between neighboring nodes in heterogeneous Wireless Sensor Networks." 2015 European Conference on Networks and Communications (EuCNC). Conference dates Jun. 29 to Jul. 2, 2015.

Lucrecio et. al. "Systems and Methods for Hybrid Cloud-Edge Computing Method for Automated Decision Making and Probabilistic Occurrence." U.S. Appl. No. 62/520,348, filed Jun. 15, 2017. Expired.

PCT International Search Report, International Application No. PCT/US 20/50728. International search completed Nov. 5, 2020. International Search Report dated Dec. 16, 2020. pp. 1-2.

PCT Application No. PCT/US2021/038140, International Search Report and Written Opinion, dated Nov. 8, 2021, 11 pages.

Hassan et al. "A Design of Packages Tracking System Based on Radio Frequency Identification" IEEE 2018.

* cited by examiner

| WIRELESS AGENT ATTRIBUTES TABLE | | |
|---|---|---|
| MASTER AGENT | SECONDARY AGENT | TERTIARY AGENT |
| Child Node | Intermediate Parent Node | Parent Node |
| Low Power Communications Interface (White) | Low And Medium Power Communications Interfaces (Green) | Low, Medium, High Power Communications Interfaces (Black) |
| Bluetooth LE | Bluetooth LE<br><br>LoRa | Bluetooth LE<br><br>LoRa<br><br>Cellular<br><br>NFC<br><br>RFID |

FIG. 5

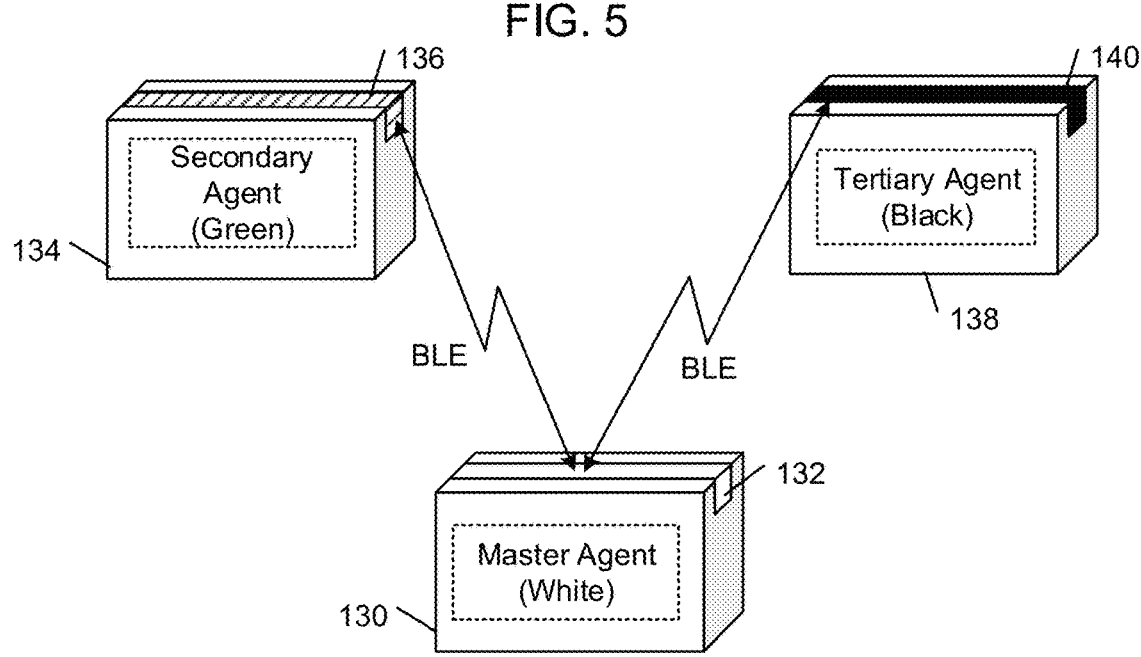

FIG. 6

WIRELESS AUTONOMOUS AGENT PLATFORM

The present disclosure claims priority to U.S. Provisional Patent Application No. 62/900,377, filed on Sep. 13, 2019, which is incorporated herein in its entirety.

FIELD OF THE DISCLOSURE

The disclosure generally relates in part to wireless autonomous agent platforms for asset management.

BACKGROUND

Wireless node networks traditionally are implemented as centralized or tree-based network topologies in which a small set of nodes are directly linked to each other hierarchically, such as star and tree topologies. Star and tree topologies are non-linear data structures that organize objects hierarchically. These topologies consist of a collection of nodes that are connected by edges, where each node contains a value or data, and each node may or may not have a child node. Oftentimes, the nodes of a wireless sensor network are organized hierarchically according to the roles and attributes of the nodes (e.g., communications range, battery life, processor clock rate, etc.), where the nodes may include sensors deployed in the field. For example, the nodes of a wireless sensor network may be organized as a hierarchical tree structure with one or more short range, low power child nodes populating the bottom level of the tree structure, and a high power master node at a higher level of the tree structure to manage the child nodes.

SUMMARY

In an aspect, the present disclosure includes a wireless autonomous agent platform that enables low-cost wireless network installations. In particular, by configuring low power child agents in a tree structure as master agents with unilateral control over higher power agents, the higher power agents can realize a substantial savings in battery life. In contrast, higher power parent agents are conventionally deployed as master agents that have unilateral control over child agents. In this role, the master agents are frequently operating in a packet scan mode listening for transmissions from a plurality of low power child agents. The scan mode of operation draws power from batteries in the master agents at a much faster rate than an advertising or broadcasting mode of operation. In addition, many use models typically involve checking in with the child agents (e.g., to verify that they are located on premises). This can lead to network congestion and increased latency as the number of child nodes increases.

In some embodiments, the wireless autonomous agent platform includes wireless tape agents. A wireless tape agent (also referred to herein as a "tape node") may include wireless communication devices that have a flexible adhesive tape form factor. Each wireless tape agent may include one or more wireless communication interface and associated communication components (e.g., antennas). Some wireless tape agents may include wireless communication interfaces of different types that are configured for wireless communication over different distances. Different wireless tape agents may be configured with different wireless communication interfaces and components based on different functionalities and roles assigned to each wireless tape agent. According to some embodiments, a wireless tape agent may include other devices or wireless agents than those having the flexible adhesive tape form factor.

In an embodiment, a plurality of tape agents comprises an autonomous master wireless tape agent and a secondary agent. The autonomous master wireless tape agent corresponds to a child node in a hierarchy and comprises a processor, a memory, a power source, and a first wireless communications interface type operative to communicate over a wireless communications link with an associated secondary wireless agent corresponding to a parent node in the hierarchy. The master wireless tape agent governs the wireless communications link and traffic between the master wireless tape agent and the secondary wireless agent. The master wireless tape agent is operative to schedule a designated time slot for each secondary wireless agent transmission. The secondary wireless agent corresponds to a parent node in the hierarchy that comprises the first wireless communications interface type, a second wireless communications interface type that has a longer wireless communications range than the first wireless communications interface type, a processor, a memory, and a power source. The secondary wireless agent is operative to synchronize its transmit and receive timing with that of the master wireless tape agent and respond to requests received from the master wireless tape agent.

In embodiments, the plurality of tape agents further comprises a tertiary wireless agent corresponding to a parent node in the hierarchy. The tertiary wireless agent comprises a processor, a memory, a power source, the first wireless communications interface type, the second wireless communications interface type, and a third wireless communications interface type that has a longer wireless communications range than the second wireless communications interface type. The tertiary wireless agent is associated with the master wireless tape agent and the secondary wireless agent.

In embodiments, the master wireless tape agent has unilateral control over the secondary and tertiary wireless agents. In some embodiments, each of the secondary and tertiary wireless agents include one or more wireless communication interfaces that are backward compatible with the wireless communication interface of the master wireless tape agent.

In embodiments, the autonomous master wireless tape agent may be associated with an asset (e.g., a package, a piece of equipment, a tool, etc.). The master wireless tape agent may comprise one or more sensors that are operative to generate one or more respective data sets by sensing one or more environmental stimuli. The master wireless tape agent is operative to transmit the one or more data sets to the associated secondary wireless agent to compute one or more statistics from the one or more data sets. The associated secondary wireless agent is operative to derive one or more analytics based on the computed statistics in accordance with one or more machine learning algorithms for anomaly detection or condition monitoring. The master wireless tape agent is operative to retrieve the one or more analytics from the one or more associated secondary wireless agents.

In embodiments, the master wireless tape agent is operative to: transmit to one or more other agents a request for a resource of a particular type required to complete a task; receive a reply message from at least one of the one or more other agents that can provide the requested resource; select one of the at least one other agents to perform the task using the resource; and receive a confirmation from the selected other agent.

In embodiments, the master wireless tape agent is operative to establish a wireless communications link with the secondary wireless agent and, in response to the establishment of the wireless communications link, the secondary agent is operative to expose one or more services that are available from the designated secondary wireless agent.

In embodiments, the confirmation message comprises an indication that the task has been completed. Each secondary wireless agent is operative to begin a transmission in a time slot explicitly reserved for the secondary wireless agent.

In embodiments, the secondary wireless agent is operative to begin a transmission in a time slot immediately following a time slot in which the secondary wireless agent was addressed by the master wireless tape agent.

In embodiments, one or more of the associated secondary wireless agents are wireless tape agents affixed to one or more respective assets.

In embodiments, one or more of the associated secondary wireless agents are wireless tape agents affixed to infrastructure of physical premises.

In embodiments, one or more of the associated secondary wireless agents are electrically pluggable into a socket of an electric power supply.

In another embodiment, a method comprises: by the wireless tape agent, transmitting to one or more other agents a request for a resource of a particular type required to complete a task; receiving, by the wireless tape agent, a reply message from at least one of the one or more other agents that can provide the requested resource; selecting, by the wireless tape agent, one of the at least one other agents to perform the task using the resource; and receiving, by the wireless tape agent, a confirmation from the selected other agent.

In embodiments, the receiving comprises receiving, by the wireless tape agent, an indication that the task has been completed.

The present disclosure includes methods, apparatus operable to implement the methods described herein, and computer-readable media storing computer-readable instructions causing a computer to implement the methods described herein.

Other features, aspects, objects, and advantages of the subject matter described in this specification will become apparent from the description, the drawings, and the claims.

BRIEF DESCRIPTION OF THE DRAWINGS

FIG. 5 is a table of attributes of three different types of tape agents, according to some embodiments.

FIG. 6 a diagrammatic view of a master agent communicating with a secondary agent and a tertiary agent, according to some embodiments.

DETAILED DESCRIPTION

The present disclosure is not limited in any way to the illustrated embodiments. Instead, the illustrated embodiments described below are merely examples. Therefore, the structural and functional details disclosed herein are not to be construed as limiting the claims. The disclosure merely provides bases for the claims and representative examples that enable one skilled in the art to make and use. Furthermore, the terms and phrases used herein are intended to provide a comprehensible description without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

The term "tape node" refers to an adhesive tape platform or a segment thereof that is equipped with a sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," and "unit" refer to hardware, software, or firmware, or a combination thereof.

In certain contexts, the terms "parcel," "envelope," "box," "package," "container," "pallet," "carton," "wrapping," and the like are used interchangeably herein to refer to a packaged item or items.

Exemplary Embodiments

Figure 1:
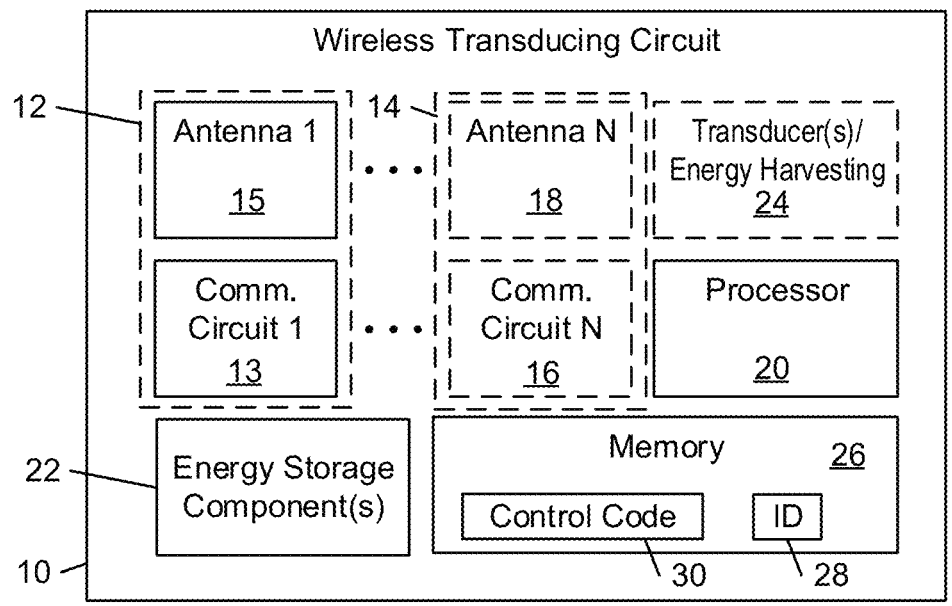
FIG. 1 is a schematic view of an example wireless transducer circuit, according to some embodiments.

FIG. 1 shows a block diagram of the components of an example wireless transducing circuit 10 that includes one or more communication systems 12, 14, according to some embodiments. Example communication systems 12, 14 include a GPS system that includes a GPS receiver circuit 13 (e.g., a receiver integrated circuit) and a GPS antenna 15, and one or more wireless communication systems each of which includes a respective transceiver circuit 16 (e.g., a transceiver integrated circuit) and a respective antenna 18. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 10 also includes a processor 20 (e.g., a microcontroller or microprocessor), one or more energy storage devices 22 (e.g., non-rechargeable or rechargeable printed flexible battery, conventional single or multiple cell battery, and/or a super capacitor or charge pump), one or more transducers 24 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the wireless transducing circuit 10.

Examples of sensing transducers 24 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 24 include light emitting components (e.g., light emitting diodes and displays), electro-acoustic transducers (e.g., audio speakers), electric motors, and thermal radiators (e.g., an electrical resistor or a thermoelectric cooler). In some embodiments, the transducers may include energy harvesting transducer components.

In some examples, the wireless transducing circuit 10 includes a memory 26 for storing data, including, e.g., profile data, state data, event data, sensor data, localization data, security data, and one or more unique identifiers (IDs) 28 associated with the wireless transducing circuit 10, such as a product ID, a type ID, and a media access control (MAC) ID, and control code 30 that includes instructions executable by the processor 20 to perform one or more autonomous agent tasks. In some examples, the memory 26 may be incorporated into one or more of the processor 20 or transducers 24, or may be a separate component that is integrated in the wireless transducing circuit 10 as shown in FIG. 1. The control code 30 typically is implemented as programmatic functions or program modules that control the operation of the wireless transducing circuit 10, including a node communication manager that manages the manner and timing of tape node communications, a node power manager that manages power consumption, and a node connection manager that controls whether connections with other nodes are secure connections (e.g., connections secured by public key cryptography) or unsecure connections, and a node storage manager that securely manages the local data storage on the wireless transducing circuit 10. In some examples, a node connection manager (not shown) ensures the level of security required by the end application and supports various encryption mechanisms. In some examples, a node power manager and communication manager (not shown) work together to optimize the battery consumption for data communication. In some examples, execution of the control code by the different types of nodes described herein may result in the performance of similar or different functions.

Figure 2:
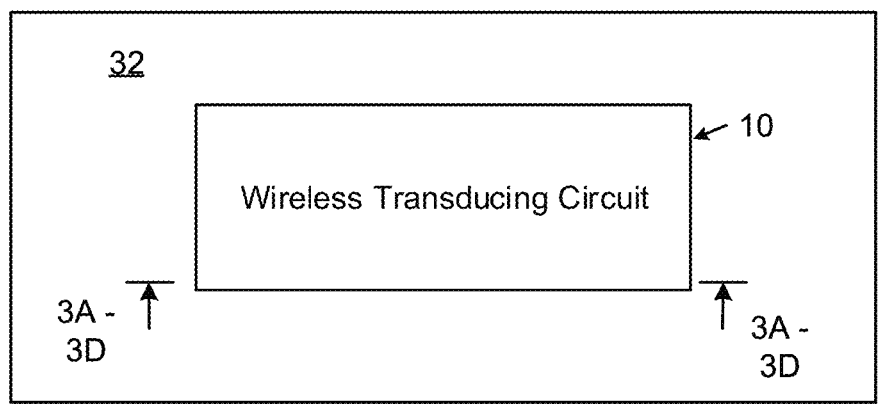
FIG. 2 is a diagrammatic top view of a length of an example autonomous agent platform containing an embedded wireless transducing circuit, according to some embodiments.

FIG. 2 is a top view of a generic platform 32 for the wireless transducing circuit 10, according to some embodiments. The platform (also referred to as a "tape node," herein) includes a respective set of the components of the wireless transducing circuit 10. In some embodiments, multiple platforms contain respective sets of components that are identical and configured in the same way. In some other embodiments, however, multiple platforms contain respective sets of components that are different and/or configured in different ways. For example, different ones of the platforms 32 have different sets or configurations of tracking and/or transducing components that are designed and/or optimized for different applications. Alternatively, different sets of segments of the platform 32 may have different ornamentations (e.g., markings on the exterior surface of the platform) and/or different dimensions.

An example method of fabricating the adhesive tape platform 32 (see FIG. 2) according to a roll-to-roll fabrication process is described in connection with FIGS. 6, 7A, and 7B of U.S. patent application Ser. No. 15/842,861, filed Dec. 14, 2017, the entirety of which is incorporated herein by reference.

The instant specification describes an example system of tape agent platforms (also referred to herein as "tape agents" or "tape nodes") that can be used to implement a low-cost wireless network infrastructure for performing monitoring, tracking, and other logistic functions relating to, for example, parcels, persons, tools, equipment and other physical assets and objects. The example system includes a set of three different types of tape nodes that have different respective functionalities and different respective cover markings that visually distinguish the different tape agent types from one another. Other systems may include fewer than three or more than three different types of tape nodes. In one non-limiting example, the covers of the different tape agent types are marked with different colors (e.g., white, green, and black). In the illustrated examples, the different tape agent types also are distinguishable from one another by their respective wireless communications capabilities and their respective sensing capabilities.

Figure 3A:
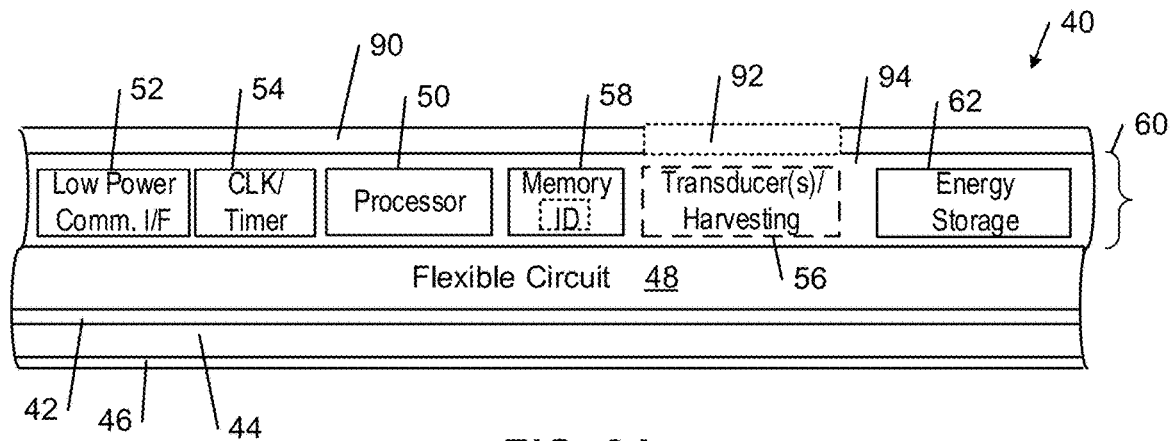
FIGS. 3A-3C show diagrammatic cross-sectional side views of portions of different respective autonomous agent tape platforms, according to some embodiments.

FIG. 3A shows a cross-sectional side view of a portion of an example segment 40 of a flexible adhesive tape platform that includes a respective set of the components of the wireless transducing circuit 10 corresponding to the first tape node type (i.e., white), according to some embodiments. A segment of the flexible adhesive tape platform may also be referred to herein as a "tape node." The flexible adhesive tape platform segment 40 includes an adhesive layer 42, an optional flexible substrate 44, and an optional adhesive layer 46 on the bottom surface of the flexible substrate 44. If the bottom adhesive layer 46 is present, a release liner (not shown) may be (removably) adhered to the bottom surface of the adhesive layer 46. In some examples, the adhesive layer 46 includes an adhesive (e.g., an acrylic foam adhesive) that has a high bond strength that is sufficient to prevent removal of the adhesive segment 40 from a surface on which the adhesive layer 46 is adhered without destroying the physical or mechanical integrity of the adhesive segment 40 and/or one or more of its constituent components. In some examples, the optional flexible substrate 44 is implemented as a prefabricated adhesive tape that includes the adhesive layers 42, 46 and the optional release liner. In other examples, the adhesive layers 42, 46 are applied to the top and bottom surfaces of the flexible substrate 44 during the fabrication of the adhesive tape platform. The adhesive layer 42 bonds the flexible substrate 44 to a bottom surface of a flexible circuit 48, that includes one or more wiring layers (not shown) that connect the processor 50, a low power wireless communication interface 52 (e.g., a Zigbee, Bluetooth® Low Energy (BLE) interface, or other low power communication interface), a clock and/or a timer circuit 54, transducing and/or energy harvesting component(s) 56 (if present), the memory 58, and other components in a device layer 60 to each other and to the energy storage component 62 and, thereby, enable the transducing, tracking and other functionalities of the flexible adhesive tape platform segment 40. The low power wireless communication interface 52 typically includes an antenna and a wireless circuit.

Figure 3B:
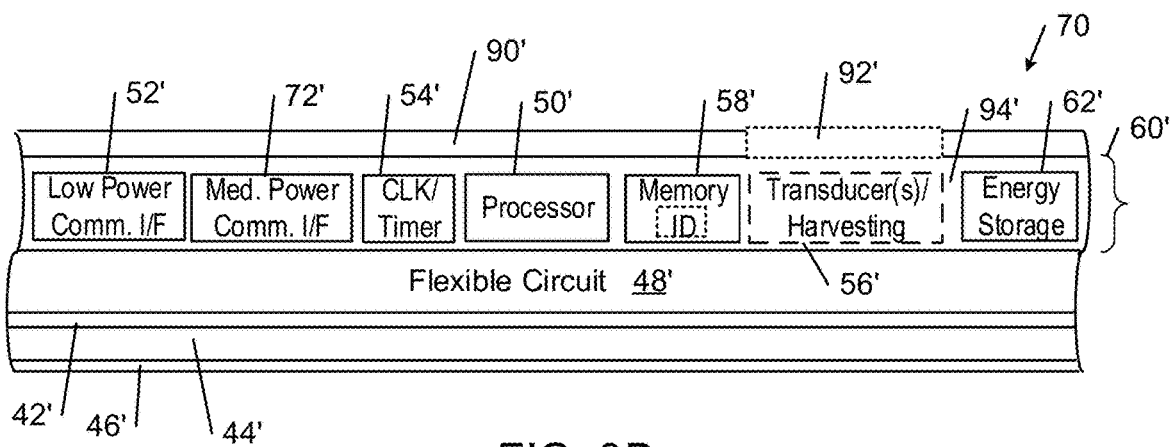

FIG. 3B shows a cross-sectional side view of a portion of an example segment 70 of the flexible adhesive tape platform that includes a respective set of the components of the wireless transducing circuit 10 corresponding to the second tape node type (i.e., green), according to some embodiments. In this example, the flexible adhesive tape platform segment 70 differs from the segment 40 shown in FIG. 3A by the inclusion of a medium power communication interface 72' (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 70 differ, for example, in functionality or capacity (e.g., larger power source).

Figure 3C:
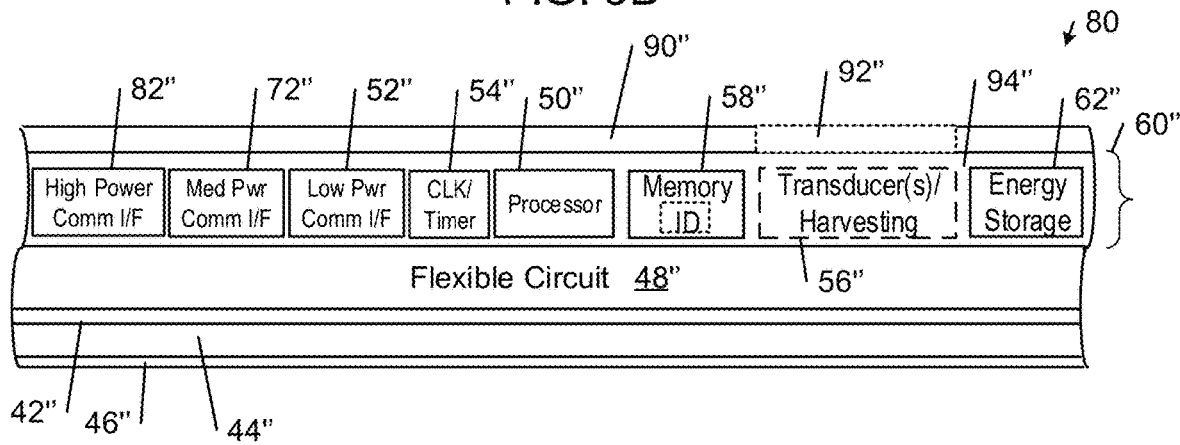

FIG. 3C shows a cross-sectional side view of a portion of an example segment 80 of the flexible adhesive tape platform that includes a respective set of the components of the wireless transducing circuit 10 corresponding to the third tape node type (i.e., black), according to some embodiments. In this example, the flexible adhesive tape platform segment 80 includes a high power communications interface 82" (e.g., a cellular interface; e.g., GSM/GPRS), a medium power communications interface 72, and a low power communications interface 52". The high power communication range provides global coverage to available infrastructure (e.g. the cellular network). In some examples, one or more other components of the flexible adhesive tape platform segment 80 differ, for example, in functionality or capacity (e.g., larger energy source).

FIGS. 3A-3C show examples in which the cover layer 90, 90', 90" of the flexible adhesive tape platform includes one or more interfacial regions 92, 92', 92" positioned over one or more of the transducers 56, 56', 56". In examples, one or more of the interfacial regions 92, 92', 92" have features, properties, compositions, dimensions, and/or characteristics that are designed to improve the operating performance of the platform for specific applications. In some examples, the flexible adhesive tape platform includes multiple interfacial regions 92, 92', 92" over respective transducers 56, 56', 56", which may be the same or different depending on the target applications. Example interfacial regions include an opening, an optically transparent window, and/or a membrane located in the interfacial regions 92, 92', 92" of the cover 90, 90', 90" that is positioned over the one or more transducers and/or energy harvesting components 56. Additional details regarding the structure and operation of example interfacial regions 92, 92', 92" are described in U.S. Provisional Patent Application No. 62/680,716, filed Jun. 5, 2018, and U.S. Provisional Patent Application No. 62/670,712, filed May 11, 2018.

In some examples, a flexible polymer layer 94, 94', 94" encapsulates the device layer 60 and thereby reduces the risk of damage that may result from the intrusion of contaminants and/or liquids (e.g., water) into the device layer 60, 60', 60". The flexible polymer layer 94, 94', 94" also planarizes the device layer 60. This facilitates optional stacking of additional layers on the device layer 60, 60', 60" and also distributes forces generated in, on, or across the adhesive tape platform segments 40, 70, 80 so as to reduce potentially damaging asymmetric stresses that might be caused by the application of bending, torqueing, pressing, or other forces that may be applied to the flexible adhesive tape platform segments 40, 70, 80 during use. In the illustrated example, a flexible cover 90, 90', 90" is bonded to the planarizing polymer 94, 94', 94" by an adhesive layer (not shown).

The flexible cover 90, 90', 90" and the flexible substrate 110 may have the same or different compositions depending on the intended application. In some examples, one or both of the flexible cover 90, 90', 90" and the flexible substrate 44, 44', 44" include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 90, 90', 90" and the adhesive layers 42, 42', 42", 46, 46', 46" on the top and bottom surfaces of the flexible substrate 44, 44', 44" typically include a pressure-sensitive adhesive (e.g., a silicon-based adhesive). In some examples, the adhesive layers are applied to the flexible cover 90 and the flexible substrate 44, 44', 44" during manufacture of the adhesive tape platform (e.g., during a roll-to-roll or sheet-to-sheet fabrication process). In other examples, the flexible cover 90, 90', 90" may be implemented by a prefabricated single-sided pressure-sensitive adhesive tape and the flexible substrate 44 may be implemented by a prefabricated double-sided pressure-sensitive adhesive tape; both kinds of tape may be readily incorporated into a roll-to-roll or sheet-to-sheet fabrication process. In some examples, the flexible polymer layer 44, 44', 44" is composed of a flexible epoxy (e.g., silicone).

In some examples, the energy storage device 62, 62', 62" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 52, 52', 52" and/or the processor(s) 50, 50', 50" may be integrated on the flexible battery substrate. In some examples, one or more of such components also (e.g., the flexible antennas and the flexible interconnect circuits) may be printed on the flexible battery substrate.

In some examples, the flexible circuit 48, 48', 48" is formed on a flexible substrate by printing, etching, or laminating circuit patterns on the flexible substrate. In some examples, the flexible circuit 48, 48', 48" is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 40, 70, 80 shown in FIGS. 3A-3C, the flexible circuit 48, 48', 48" is a single access flex circuit that interconnects the components of the adhesive tape platform on a single side of the flexible circuit 48, 48', 48". In other examples, the flexible circuit 48, 48', 48" is a double access flex circuit that includes a front-side conductive pattern that interconnects the low power communications interface 52, 52', 52", the timer circuit 54, 54', 54", the processor 50, 50', 50", the one or more transducers 56, 56', 56" (if present), and the memory 58, 58', 58", and allows through-hole access (not shown) to a back-side conductive pattern that is connected to the flexible battery (not shown). In these examples, the front-side conductive pattern of the flexible circuit 48, 48', 48" connects the communications circuits 52, 52', 52", 72, 72', 72", 82" (e.g., receivers, transmitters, and transceivers) to their respective antennas and to the processor 50, 50', 50" and also connects the processor 50, 50', 50" to the one or more sensors and the memory 58. The backside conductive pattern connects the active electronics (e.g., the processor 50, 50', 50", the communications circuits 52, 52', 52", 72', 72", 82" and the transducers) on the front-side of the flexible circuit 48, 48', 48" to the electrodes of the flexible battery 62, 62', 62" via one or more through holes in the substrate of the flexible circuit 48, 48', 48".

Figure 4A:
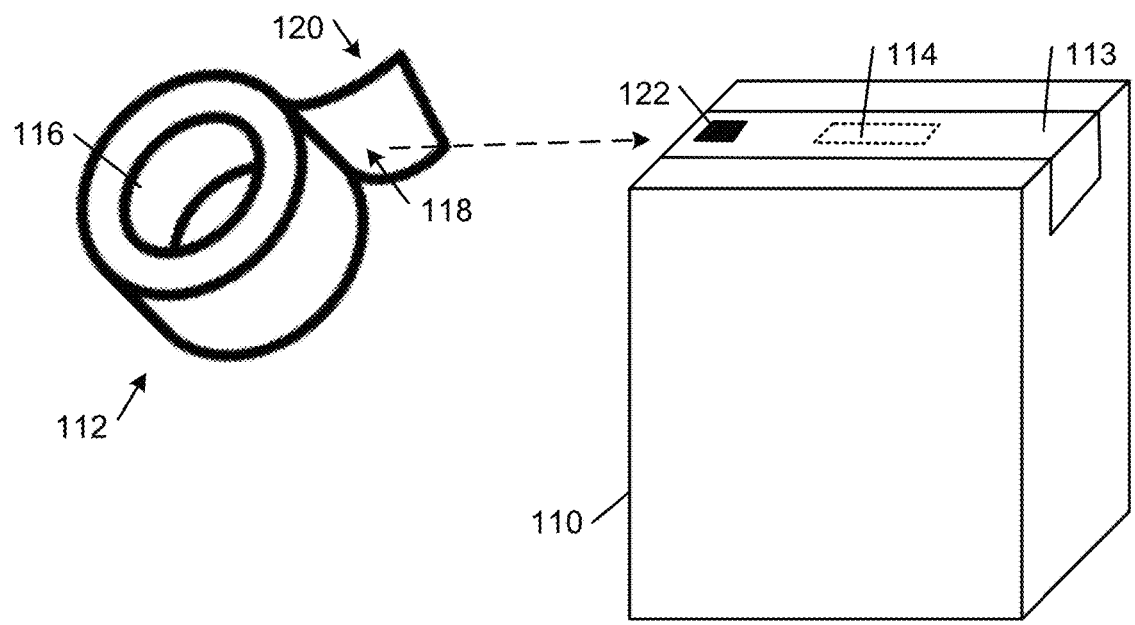
FIG. 4A is a diagrammatic view of an asset that has been sealed for shipment using a segment of an example tracking adhesive product dispensed from a roll, according to some embodiments.

FIG. 4A shows an example asset 110 (a package, in this example) that is sealed for shipment using an example adhesive tape platform 112 that includes embedded components of a wireless transducing circuit 114 (collectively referred to herein as a "tape node"), according to some embodiments. In this example, a segment 113 of the adhesive tape platform 112 is dispensed from a roll 16 and affixed to the asset 110. The adhesive tape platform 112 includes an adhesive side 118 and a non-adhesive side 120. The adhesive tape platform 112 can be dispensed from the roll 116 in the same way as any conventional packing tape, shipping tape, or duct tape. For example, the adhesive tape platform 112 may be dispensed from the roll 116 by hand, laid across the seam where the two top flaps of the asset 110 meet, and cut to a suitable length either by hand or using a cutting instrument (e.g., scissors or an automated or manual tape dispenser). Examples of such tapes include tapes having non-adhesive sides 120 that carry one or more coatings or layers (e.g., colored, light reflective, light absorbing, and/or light emitting coatings or layers).

Figure 4B:
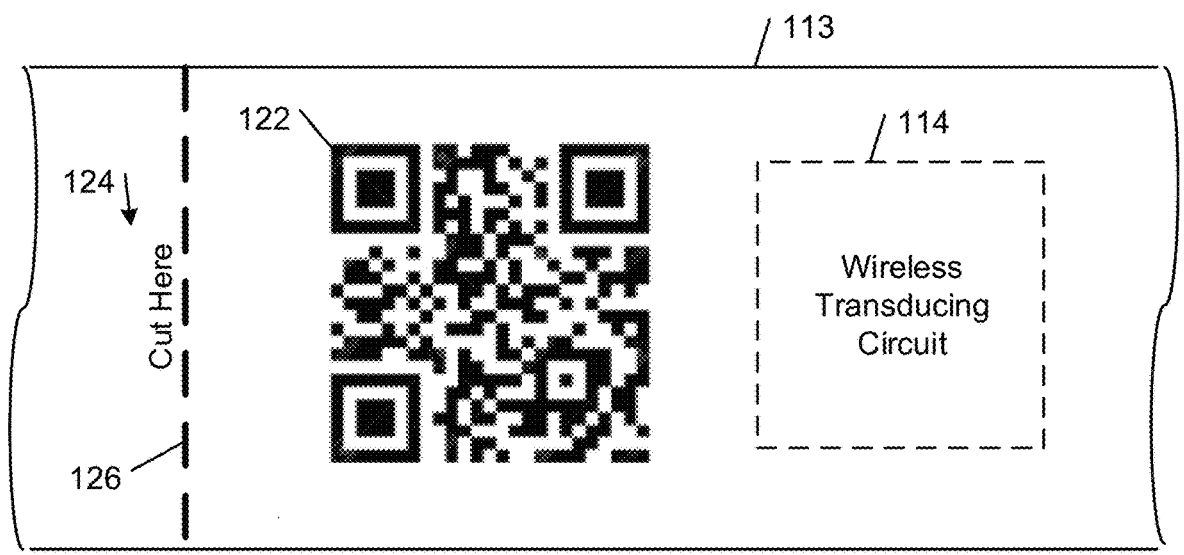
FIG. 4B is a diagrammatic top view of a portion of the segment of the example tracking adhesive product shown in FIG. 4A, according to some embodiments.

FIG. 4B is a diagrammatic top view of a portion of the segment of the example tracking adhesive product shown in FIG. 4A, according to some embodiments. Referring to FIG. 4B, in some examples, the non-adhesive side 120 of the segment 113 of the adhesive tape platform 112 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the segment 113 of the adhesive tape platform 112 includes a two-dimensional bar code (e.g., a QR Code) 122, written instructions 124 (i.e., "Cut Here"), and an associated cut line 126 that indicates where the user should cut the adhesive tape platform 112. The written instructions 124 and the cut line 126 typically are printed or otherwise marked on the top non-adhesive surface 120 of the adhesive tape platform 12 during manufacture. The two-dimensional bar code 122, on the other hand, may be marked on the non-adhesive surface 120 of the adhesive tape platform 112 during the manufacture of the adhesive product 112 or, alternatively, may be marked on the non-adhesive surface 120 of the adhesive tape platform 112 as needed using, for example, a printer or other marking device. In some embodiments, the non-adhesive side 120 of the segment 113 may include additional markings (not shown). For example, the non-adhesive side 120 of the segment 113 may include markings that indicate a relative position of a sensor or other component of the wireless transducing circuit 114.

In order to avoid damaging the functionality of the segments of the adhesive tape platform 112, the cut lines 126 typically demarcate the boundaries between adjacent segments at locations that are free of any active components of the wireless transducing circuit 114. The spacing between the wireless transducing circuit components 114 and the cut lines 126 may vary depending on the intended communication, transducing and/or adhesive taping application. In the example illustrated in FIG. 4A, the length of the adhesive tape platform 112 that is dispensed to seal the asset 110 corresponds to a single segment of the adhesive tape platform 112. In other examples, the length of the adhesive tape platform 112 needed to seal a package or otherwise serve the adhesive function for which the adhesive tape platform 112 is being applied may include multiple segments 113 of the adhesive tape platform 112, one or more of which segments 113 may be activated upon cutting the length of the adhesive tape platform 112 from the roll 16 and/or applying the length of the adhesive tape platform to the asset 110.

In some examples, the transducing components 114 that are embedded in one or more segments 113 of the adhesive tape platform 112 are activated when the adhesive tape platform 112 is cut along the cut line 126. In these examples, the adhesive tape platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 114 in one or more segments of the adhesive tape platform 112 in response to being separated from the adhesive tape platform 112 (e.g., along the cut line 126).

In some examples, each segment 113 of the adhesive tape platform 112 includes its own respective energy source. In some embodiments, the energy source is a battery of a type described above, an energy harvesting component or system that can harvest energy from the environment, or both. In some of these examples, each energy source is configured to only supply power to the components in its respective adhesive tape platform segment regardless of the number of contiguous segments 32 that are in a given length of the adhesive tape platform 112. In other examples, when a given length of the adhesive tape platform 112 includes multiple segments 113, the energy sources in the respective segments 113 are configured to supply power to the transducing components 114 in all of the segments 13 in the given length of the adhesive tape platform 112. In some of these examples, the energy sources are connected in parallel and concurrently activated to power the transducing components 114 in all of the segments 113 at the same time. In other examples, the energy sources are connected in parallel and alternately activated to power the transducing components 114 in respective ones of the adhesive tape platform segments 113 at different time periods, which may or may not overlap.

This specification describes an example system of wireless communications devices that can be used to implement an ultra low-cost wireless network infrastructure for performing monitoring, tracking, and other logistic functions relating to, for example, parcels, persons, tools, equipment and other physical assets and objects. In one example, the system includes a set of three different types of wireless transducing circuits 10 embedded in a flexible adhesive tape form factor that have different respective functionalities and optionally different respective cover markings that visually distinguish the different wireless communications device types from one another. In one non-limiting example, the covers of the different wireless communications interface types are marked with different colors (e.g., white, green, and black). In the illustrated examples, the different wireless communications interface types are distinguishable from one another by their respective wireless communications capabilities and their respective sensing capabilities. In other examples, the wireless transducing circuits 10 may be incorporated into different form factors, such as a set of devices that are pluggable into an alternating current (AC) electrical power outlet or a direct current (DC) electrical power outlet.

Agent Hierarchy

In the present disclosure, two hierarchies are discussed which include a parent-child hierarchy and a hierarchy of roles (including the master agent, secondary agent, and tertiary agent roles). In some embodiments, the parent-child hierarchy refers to the communication distances that are associated with the configuration of a tape node's wireless communication interface. For example, child nodes may include shorter range wireless communication interfaces (e.g., Bluetooth communications), while parent nodes may include both a wireless communication interface for communicating with their associated child nodes and longer range wireless communication interfaces that have the capability of communicating at distances greater than those of the child node.

The hierarchy of roles determines which wireless agents controls communications between agents, according to some embodiments. For example, a wireless agent with a master agent role controls the communication (including protocols, scheduling, and timing of communications) between itself and any associated secondary and tertiary wireless agents. In the present disclosure, the child nodes of the parent-child hierarchy are assigned the master agent role, and the child nodes control communications between itself and its associated parent nodes (which have secondary or tertiary agent roles). This contrasts with conventional systems which assign the parent nodes of the parent-child hierarchy the master agent role.

The parent nodes (which have the secondary and tertiary agent roles) are higher power nodes that may include longer range wireless communication interfaces than those of the child nodes (which have the master agent role) that are lower power nodes, according to some embodiments. In some embodiments, the higher power parent nodes include a higher number of wireless communication interface types (for different wireless communication protocols and distances). According to embodiments, the higher power parent nodes may include additional functionality that the lower power child nodes do not possess, such as the capability to collect sensor data using sensors associated with the higher power parent node. The higher power parent nodes may have a higher demand on their resources (e.g. higher power consumption) due to the longer range wireless communications and additional functionality than the lower power child nodes. Using the methods and system of the present disclosure, the power consumption of the wireless agents may be optimized and result in longer battery life for wireless agents. Additionally, the necessary network bandwidth for communications between the wireless agents may also be optimized due to reduced network congestion in comparison to conventional methods and systems.

FIG. 5 is a table 129 of an example set of wireless tape agents and their respective attributes, according to some embodiments. The left column of the wireless agent attributes table 129 lists the attributes of the master agent. Among the attributes of the master agent are: a master agent role; a child node placement in physical premises (a peripheral or leaf node placement); and a low power wireless communications interface (e.g., a Bluetooth LE communications interface or a Zigbee communications interfaces). The master agent role attribute enables the master agent to exercise unilateral control over other non-master types of agents, such as the secondary agent and the tertiary agent. The child node attribute configuration corresponds to a peripheral end node or leaf node that interacts in a particular environment (e.g., physical premises, such as a building, warehouse, loading dock, etc.). The child node placement may correspond to the master agent being placed in physical proximity to an asset being tracked with the master agent, according to some embodiments. In the illustrated embodiment, the child node has a low power communications interface (e.g., Bluetooth LE) for communicating with other nodes over short distance wireless communications links.

The center column of the wireless agent attributes table 129 lists the attributes of the secondary agent. Among the attributes of the secondary agent are: a secondary agent role; a node placement in physical premises within communication range of one or more child nodes and optionally within communication range of one or more of the tertiary agent parent nodes (i.e. an intermediate parent node placement); and low and intermediate power wireless communications interfaces (e.g., Bluetooth LE and LoRa communications interfaces). The secondary agent role enables the master agent to exercise unilateral control over the secondary agent. The intermediate parent node attribute configuration corresponds to an intermediate node that communicates with the child nodes in the physical premises and communicates with the tertiary agent. In the illustrated embodiment, the secondary agent has a low power communications interface (e.g., Bluetooth LE communications interface) for communicating with the child nodes and an intermediate power communications interface (e.g., LoRa communications interface) for communicating with a parent node or server node over longer distance wireless communication links. In some embodiments, the intermediate power communications interface consumes more power than the low power communication interface. In the illustrated embodiment, the communications interfaces of the secondary tape agent are backward compatible with the child nodes.

The right column of the wireless agent attributes table 129 lists the attributes of the tertiary agent. Among the attributes of the tertiary tape agent are: a tertiary agent role; a placement in relation to the physical premises that is within range of the of the secondary agent and optionally within communication range of one or more of the master agent; and low, intermediate, and high power communications interfaces (e.g., Bluetooth LE, LoRa, Cellular, NFC, and RFID communications interfaces) for communicating with the child nodes, the secondary agents, gateways, and servers. The high power communication interfaces may consume more power than the intermediate communication interfaces, according to some embodiments. The high power communication interfaces may have a higher distance or range of wireless communication than the intermediate communication interfaces, according to some embodiments. The tertiary agent role enables the master agent to exercise unilateral control over the tertiary agent. In the illustrated embodiment, the communications interfaces of the tertiary tape agent are backward compatible with the child nodes and secondary nodes. In other embodiments, the tertiary tape agent is only configured to communicate with the secondary tape agent, and the tertiary agent's communications with the master tape agent are relayed via the secondary agent.

FIG. 6 shows three assets, each of which is associated with a respective wireless agent (also referred to herein as a "tape agent" or "wireless tape agent") 132, 136, 140, according to some embodiments. In particular, a first asset 130 is associated with a master tape agent 132 that corresponds to the child node, which has a low power communications interface (e.g., Bluetooth LE) and is optionally marked with a white colorant. A second asset 134 is associated with the secondary tape agent 136 that corresponds to the intermediate parent node, which has a low power communications interface (e.g., Bluetooth LE) and a medium power communications interface (e.g., LoRa) and is optionally marked with a green colorant. A third asset 138 is associated with the tertiary tape agent 140 that corresponds to a high power parent node that has three low power communications interfaces (e.g., Bluetooth LE, NFC, and RFID), a medium power communications interface (e.g., LoRa), and a high power communications interface (e.g., cellular), and is optionally marked with a black colorant. The communications interfaces of the secondary tape agent 136 and the tertiary tape agent 140 are backward compatible with the communications interface (e.g., Bluetooth LE) of the master tape agent 132.

In addition to packaging applications, the master, secondary, and tertiary tape agents may be deployed on or within physical premises, such as buildings, warehouses, and other infrastructure. For example, in some embodiments, the secondary and tertiary tape agents may be deployed on physical premises infrastructure (e.g., walls, doors, and conveyor systems), vehicles (e.g., fork lifts, trucks, and carts), and objects (e.g., boxes, packages, documents, coffee mugs).

The above-described approach provides substantial benefits in terms of reduced cost and higher performance of the wireless tape agents.

In a conventional approach, nodes are arranged hierarchically with higher power parent nodes designated as master nodes that are located at higher levels in the node hierarchy and have unilateral control over the low power child nodes, which are located at the bottom level of the child-parent hierarchy. In this approach, the master nodes are configured to periodically scan for transmissions from the child nodes. As a result, the conventional approach places a high demand on the resources (e.g., higher power consumption) of the master nodes. This demand is particularly high when there are numerous child nodes, which tends to rapidly decrease the battery levels of the master nodes and increase network congestion between the high power master nodes and the numerous child nodes.

In contrast, in accordance with the present disclosure, the low power child node is the master agent 132, which has unilateral control over the parent nodes (e.g., the secondary agent 136 and the tertiary agent 140). As a result, many of the tasks previously performed by the secondary and tertiary tape agents now are unnecessary. Since the secondary and tertiary tape agents no longer perform those tasks, the secondary and tertiary agents may have less demand on their resources, compared to the conventional approach described above. For example, in this configuration, there is no need for the higher-power parent nodes to scan for transmissions from the child nodes; instead, the master agent 132 (child node) drives the communications flow (advertisements) from the master agent 132 to the secondary agents and the tertiary agents 136, 140. In this process, the master agent 132 transmits service requests to the secondary agent 136 or the tertiary agent 140, or both. In this way, there is no need for the secondary agent 136 and the tertiary agent 140 to initiate a scan for packet transmissions from the child nodes, since the secondary agent 136 and the tertiary agent 140 only needs to respond to the transmitted service requests, in some embodiments. In addition, the child nodes operate autonomously, and thereby substantially avoid network congestion by sending requests for service to the secondary and tertiary agents 136, 140 only when needed.

In some network environments, one or more of the master agent 132, the secondary agent 136, and the tertiary agent 140 are provided with descriptions of the resources that are available from the nodes on the network. Examples of such resources are sensors, such as a temperature sensor, a moisture sensor, and an acceleration sensor; communication interfaces, such as Bluetooth communications interfaces, LoRa communications interfaces, and cellular communications interfaces; power sources, such as mains power and battery power; and memory resources. In an example, when the master agent (child node) detects that it has insufficient resources to complete a task, the master agent (child node) can inquire whether the insufficiency can be remedied by sharing one or more resources that are available from one or more agents on the network. In this process, the master agent (child node) broadcasts to the other nodes in the environment a request for the type of resource required and a deadline for completing the task. If one or more of the other agents in the environment can satisfy the request, one or more of the other agents send reply messages to the master agent (child node). The master agent (child node) selects one of the other agents to provide the resource based on one or more criteria (e.g., the first agent to reply to the request). In some embodiments, the master agent (child node) receives a confirmation message from the selected other agent that the requested task either was completed or was not completed. Depending on the type of task to be performed by the selected agent, the master agent (child node) may or may not receive a data payload in the confirmation message. The data payload may include data relevant to the task, such as sensor data for a task requiring a resource that is a sensor.

In some embodiments, the criteria for selecting one of the other agents to provide the resource includes a battery level of the agent. For example, if multiple agents can satisfy the request, the master agent may select the agent that has the highest battery level. In some embodiments, the criteria may include the physical location of the agent. In some embodiments, the criteria may include the hierarchical role (parent, child, master, secondary, tertiary) of the agent. In some embodiments, the criteria may include resources other than the requested resource available to the agent. In other embodiments, other criteria may be used to select the agent for performing the task. The criteria may include some combination of the criteria described above, according to some embodiments.

In some embodiments, the resource is a sensor. In some embodiments, the resource may be a wireless communication interface of a particular type (e.g., a longer range wireless communication interface type). In other embodiments, the resource may include data that is not stored on the master agent requesting the resource. Other types of resources may be requested for performing a task, according to some embodiments. The resources may include some combination of the resource types described above, according to some embodiments.

The resource sharing process described in the preceding paragraphs also can be used by the secondary and tertiary agents. For example, the secondary agents and the tertiary agents may each request resources in the same way that the master agent does, as described above.

Figure 7:
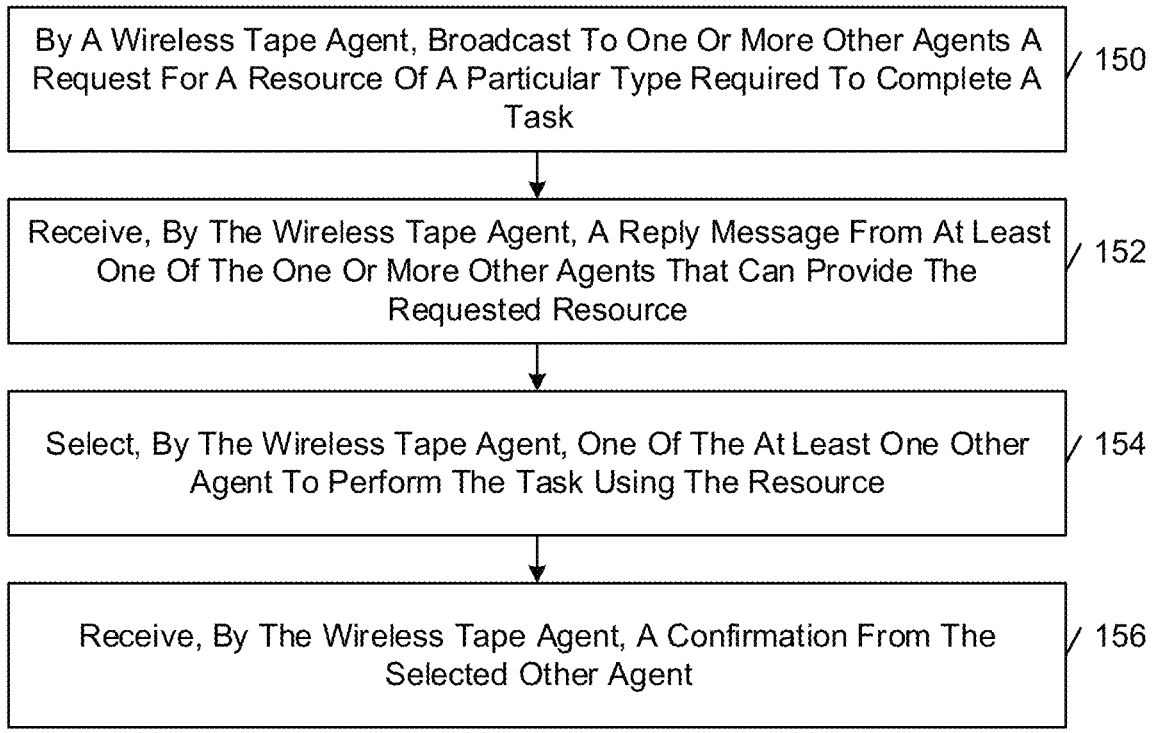
FIG. 7 is a flow diagram of a method of sharing resources between wireless tape agents, according to some embodiments.

FIG. 7 shows a flow diagram of a resource sharing process among wireless network nodes, according to some embodiments. A wireless tape agent (e.g., a wireless master tape agent) broadcasts to one or more other agents a request for a resource of a particular type that is required to complete a task to be performed by the wireless tape agent (FIG. 7, block 150). The wireless tape agent receives a reply from at least one of the one or more other agents that can provide the requested resource (FIG. 7, block 152). The wireless tape agent selects one of the at least one other agent that can provide the requested resource to perform the task using the resource (FIG. 7, block 154). The wireless tape agent receives an optional confirmation from the selected other agent (FIG. 7, block 156). The confirmation may include an indication that the task was completed or was not completed. In some embodiments, the wireless tape agent may perform additional and/or alternative steps and processes to the ones shown in FIG. 7.

Figure 8:
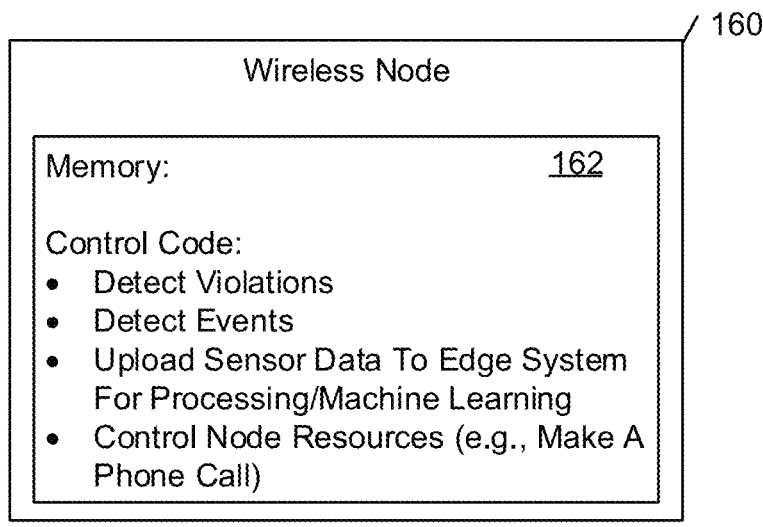
FIG. 8 is a diagrammatic view of a memory component of a wireless node, according to some embodiments.

FIG. 8 is a block diagram showing an example embodiment of a wireless node 160 that includes a memory 162 storing control code for performing various tasks, according to some embodiments. The tasks corresponding to the control code may include detecting logistic violations, tracking location of assets, tracking condition of assets, monitoring environmental stimuli (i.e., sensor data) relevant to an asset, detecting events, uploading sensor data to an edge system for generating data (e.g., statistics, analytics, etc.) for machine learning, and controlling node resources (e.g., a master agent (child node) unilaterally controlling a cellular communications interface of a tertiary agent to make a phone call). In some embodiments, the control code may correspond to other tasks.

In some embodiments, the autonomous wireless communications agents are configured with asset instructions stored in their respective memory devices to perform tasks (e.g., asset tracking and preventative logistics). In some examples, the asset instructions are determined by mapping out a description of a supply chain including assets (e.g., boxes, pallets, and containers) and inputting the description into an asset processing system. The asset processing system compiles the supply chain data to generate respective computer-readable asset instructions for each of the wireless communication devices in the overall system (e.g., wireless tape agents and line-powered wireless communications devices, collectively referred to herein as "wireless communications agents"). In some examples, the wireless communications agents act as traffic agents that detect rule violations by performing localized context-sensitive checks between periods in which the wireless communications agents are in sleep mode. The rules and rule violations may be customized to the context of the application that the wireless agents are used for. The rules may include rules for logistics, expected sensor measurements, asset management, asset racking, communication between the tape nodes, other types of rules, or some combination thereof. In some examples, the wireless communications agents download checks and rule violations that trigger alarms. For example, the rules may include supply chain rules relevant to an asset, such as those regarding whether an asset was dropped or mishandled, temperature violations, and incorrect parcel splits and consolidations. The wireless communications agents log all events (e.g., parcel splits and consolidations).

In some examples, a set of assets and a set of wireless tape agents used to track the set of assets are defined as a group using an encoding system that instructs the wireless communications agents which agent identifiers are members of the group. In some embodiments, the tape agents in the group are programmed to wake up at scheduled times to ensure that the current grouping of agents is still consistent with the asset instructions. For example, at each scheduled wakeup time, the wireless communications agents determine if there are any group members that have improperly split off from the designated group and if there are any additional members that improperly joined the designated group without receiving instructions from the asset processing system that change the membership in the defined group. In some examples, if there is an unaccounted change in the membership of the defined group, a designated one of the agents will trigger an alarm. For example, as a vehicle is being loaded with a group of parcels, one or more of the wireless communications agents are configured to detect when a parcel in the group has not been loaded on the vehicle and detect when an asset that is not part of the group has been loaded on the vehicle.

In another example, the asset processing system encodes instructions for detecting and responding to potential damage that occurs to an asset. For example, if an agent detects acceleration of the asset above a threshold acceleration level, the agent will signal the asset processing system to abort a process corresponding to the asset (e.g., shipment or transport of the asset).

Figure 9:
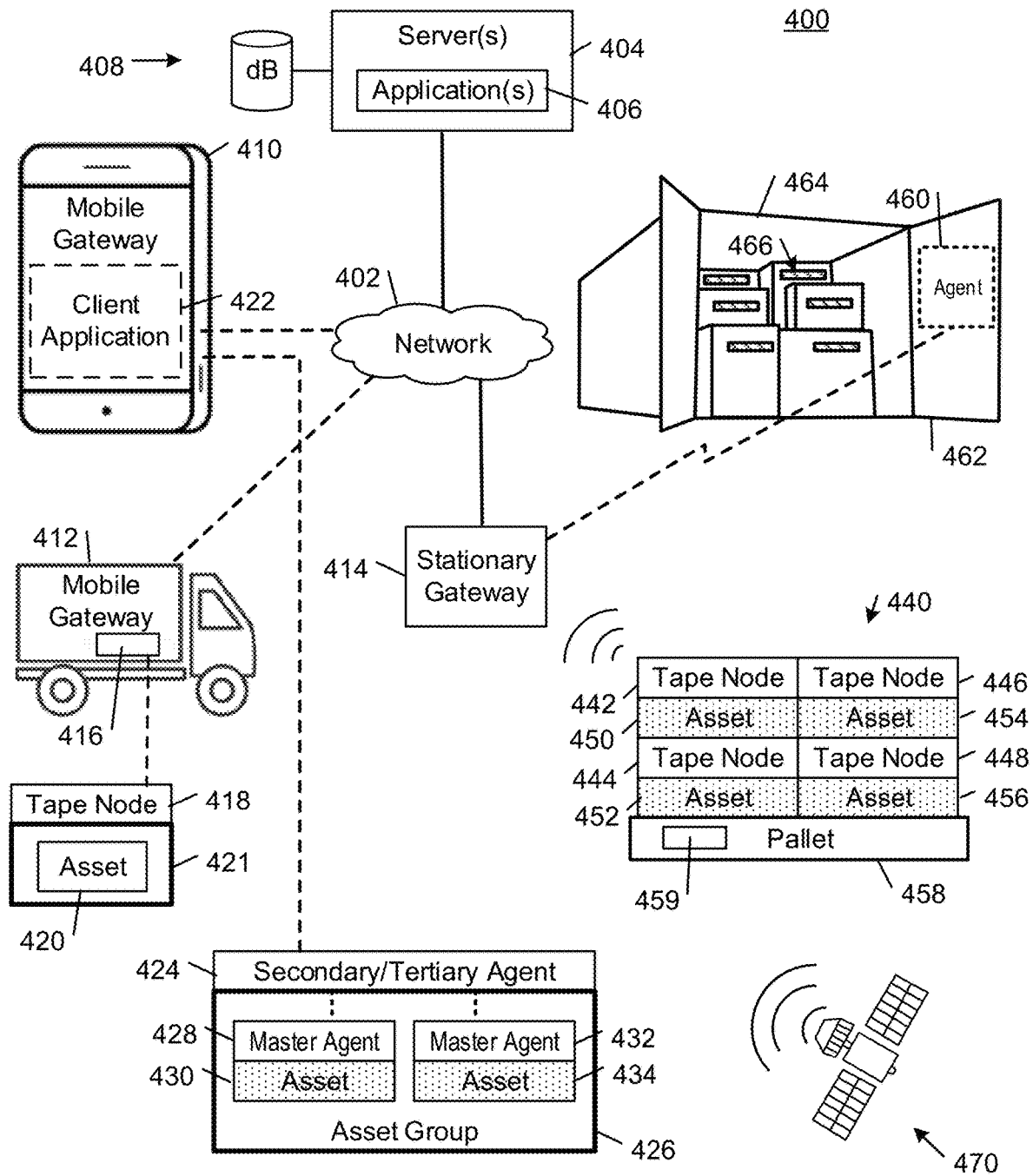
FIG. 9 is a diagram showing an example system environment for a wireless tape agent system, according to some embodiments.

FIG. 9 is a diagram showing an example system environment for a wireless tape agent system, according to some embodiments. FIG. 9 shows an example environment 400 that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 470 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the wireless network of tape nodes described above improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes can also be configured to support block chain to protect the transmitted and stored data.

A set of tape nodes can be configured autonomously in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). In some embodiments, tape nodes can be assigned to different levels of a hierarchical network according to one or more of the above-mentioned factors. For example, the hierarchy can be defined in terms of communication range or power (e.g., the child-parent node hierarchy), where tape nodes with higher power or longer communication range transceivers are arranged at a higher level of the hierarchy than tape nodes with lower power or lower range transceivers. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to an asset or other stationary or mobile object (e.g., a structural element of a warehouse or other building, or a vehicle, such as a delivery truck). This process activates the tape node, according to some embodiments. In some embodiments, the tape manufacturer may programmatically configure tape nodes that are deployed in the environment 400. In further embodiments, a user and/or administrator of the wireless tape agent system may further configure or customize tape nodes that are deployed in the environment 400. In other embodiments, the tape nodes may be programmatically configured by a user and/or administrator of the wireless tape agent system. In some examples, there are multiple classes or types of tape nodes, where each tape node class has a different respective set of functionalities and/or capacities. For example, the tape node classes may include the embodiments of the tape nodes and wireless tape agents shown in FIGS. 3A-3C and 6.

In some examples, the one or more network service servers 404 communicate over the network 402 with one or more gateways that are configured to send, transmit, forward, or relay messages to the network 402 in response to transmissions from the master agent child nodes that are associated with respective assets and within communication range. Example gateways include mobile gateways 410, 412 and a stationary gateway 414. The gateways may include other gateways (not shown) that the mobile gateways 410, 412, and the stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured to communicate with a designated set of tape nodes, including a master agent child tape node 418 that also functions as a label that is adhered to a parcel 421 (e.g., an envelope) that contains an asset 420. In some examples, the master agent child tape node 418 includes a lower power wireless communications interface of the type used in, e.g., tape node 40 (shown in FIG. 3A), and the wireless communications unit 416 is implemented by a secondary or tertiary tape node (e.g., one of tape node 70 or tape node 80, respectively shown in FIGS. 3B and 3C) that include higher power communications interfaces for communicating with tape nodes within range of the mobile gateway 412 and the network 402. In this way, the tape nodes 418 and 416 create a wireless network of nodes for transmitting, forwarding, bridging, relaying, or otherwise communicating wireless messages and data to, between, or on behalf of the master tape child node 418 in a power-efficient and cost-effective way.

In some examples, a mobile gateway 410 is a mobile phone that is operated by a human operator and executes a client application 422 that is configured by a network service to communicate with a designated set of tape nodes, including a master tape child node 424 that is adhered to a parcel 426 (e.g., a box), and is further configured to communicate with a network server 404 over the network 402. In the illustrated example, the parcel 426 contains a first parcel labeled or sealed by a master agent tape node 428 and containing a first asset 430, and a second parcel labeled or sealed by a master agent tape node 432 and containing a second asset 434. The first asset 430, the master agent tape node 428, the second asset 432, and the master agent tape node 432 are members of an asset group. The secondary or tertiary tape node 424 communicates with each of the master agent child nodes 428, 432 and also communicates with the mobile gateway 410. In some examples, each of the master agent child nodes 428, 432 includes a lower power wireless communications interface of the type used in, e.g., tape node 40 (shown in FIG. 3A), and the secondary/tertiary agent 424 is implemented by a tape node (e.g., tape node 70 or tape node 80, shown in FIGS. 3B and 3C) that includes a low power communications interface for communicating with the master agent child nodes 428, 432 contained within the parcel 426, and a higher power communications interface for communicating with the mobile gateway 410. The secondary or tertiary agent 424 is operable to relay wireless communications between the master agent child nodes 428, 432 contained within the parcel 426 and the mobile gateway 410, and the mobile gateway 410 is operable to relay wireless communications between the secondary or tertiary agent 424 and the server 404 over the wireless network 402. In this way, the master agent child nodes 428 and 432 and the secondary or tertiary agent 424 create a wireless network of nodes for transmitting, forwarding, relaying, or otherwise communicating wireless messages to, between, or on behalf of the master agent child nodes 428, 432, the secondary or tertiary agent 424, and the network service (not shown) in a power-efficient and cost-effective way.

In some examples, the stationary gateway 414 is implemented by a server executing a server application that is configured by the network service 408 to communicate with a designated set 440 of master agent child nodes 442, 444, 446, 448 that are adhered to respective parcels containing respective assets 450, 452, 454, 456 on a pallet 458. In other examples, the stationary gateway 414 is implemented by a tape node (e.g., one of tape node 70 or tape node 80, respectively shown in FIGS. 3B and 3C) that is adhered to, for example, a wall, column or other infrastructure component of the physical premises environment 400, and includes a low power communications interface for communicating with tape nodes within range of the stationary gateway 414 and a higher power communications interface for communicating with the network 402. In one embodiment, each of the tape nodes 442, 444, 446, 448 is a master agent child node and is configured by the network service 408 to communicate individually with the stationary gateway 414, which relays communications from the master agent child tape nodes 442, 444, 446, 448 to the network service 408 through the stationary gateway 414 and over the communications network 402. In another embodiment, one of the master agent child nodes 442, 444, 446, 448 at a time is configured to be a master tape node which transmits, forwards, relays, or otherwise communicates wireless messages and data to, between, or on behalf of the other master agent child tape nodes on the pallet 458. In this embodiment, the master tape node may be determined by the master agent child nodes 442, 444, 446, 448 or designated by the network service 408. In some examples, the master agent child node 442, 444, 446, 448 with the highest remaining power level is determined to be the master tape node. In some examples, when the power level of the current master agent child tape node drops below a certain level (e.g., a power threshold level or a threshold level relative to the power levels of one or more of the other master agent child tape nodes), another one of the master agent child tape nodes assumes the role of the master tape node. In some examples, a master agent child tape node 459 is adhered to the pallet 458 and is configured to perform the role of a master node for the other master agent child tape nodes 442, 444, 446, 448. In these ways, the master agent child tape nodes 442, 444, 446, 448, 458 are configurable to create different wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a secondary or tertiary tape node 460 that is adhered to the inside of a door 462 of a shipping container 464 and is further configured to communicate with the network service 408 over the network 402. In the illustrated example, the shipping container 464 contains a number of parcels labeled or sealed by respective master agent child tape nodes 466, each parcel containing respective assets. The secondary or tertiary tape node 460 communicates with each of the master child tape nodes 466 within the container 464 and communicates with the stationary gateway 414. In some examples, each of the master agent child tape nodes 466 includes a low power wireless communications interface (shown in FIG. 3A), and the secondary or tertiary tape agent 460 includes a low power communications interface for communicating with the master agent child nodes 466 contained within the shipping container 464 and a higher power communications interface for communicating with the stationary gateway 414.

In some examples, when the doors of the shipping container 464 are closed, the secondary or tertiary agent 460 is operable to communicate wirelessly with the master agent child tape nodes 466 contained within the shipping container 464. In an example, the secondary or tertiary agent 460 is configured to collect sensor data from master agent child nodes 466 and, in some embodiments, process the collected data to generate, for example, statistics from the collected data. The statistics may include, for example, a frequency spectrum of sensor data, a frequency spectrum of sensor data calculated by performing a fast Fourier transform (FFT) on the sensor data, a root-mean square (RMS) value, an average value, a median value, a peak value, a minimum value, other statistical values, or some combination thereof. When the doors of the shipping container 464 are open, the secondary or tertiary agent 460 is programmed to detect the door opening (e.g., using a photodetector or an accelerometer component of the master agent child node 460) and, in addition to reporting the door opening event to the network service 408, the secondary or tertiary agent 460 is further programmed to transmit the collected data and/or the processed data in one or more wireless messages to the stationary gateway 414. The stationary gateway 414, in turn, is operable to transmit the wireless messages received from the secondary or tertiary agent 460 to the network service 408 over the wireless network 402. Alternatively, in some examples, the stationary gateway 414 also is operable to perform operations on the data received from the secondary or tertiary agent 460 with the same type of data produced by the secondary or tertiary agent 459 based on sensor data collected from the tape nodes 442, 444, 446, 448. In this way, the secondary or tertiary agent 460 and the master agent child node 466 create a wireless network of nodes for transmitting, forwarding, relaying, or otherwise communicating wireless messages to, between, or on behalf of the master agent child node 466, the secondary or tertiary agents, and the network service 408 in a power-efficient and cost-effective way. In some embodiments the stationary gateway 414, the mobile gateways 410, 412

In an example of the embodiment shown in FIG. 9, there are three types of tape nodes that have backwards compatibility in relation to their ability to communicate with each other: a short range master agent child node 40, a medium range secondary tape agent 70, and a long range tertiary tape agent 80, as respectively shown in FIGS. 3A-3C. The short-range master agent child nodes 70 typically are adhered directly to assets or parcels containing assets. In the illustrated example, the master agent child nodes 418, 428, 432, 442, 444, 446, 448, 466 are short-range tape nodes. The short-range tape nodes typically communicate with a low power wireless communication protocol (e.g., Bluetooth LE, Zigbee, or Z-wave). The medium range tape agents 70 typically are adhered to objects (e.g., a box 426 and a shipping container 460) that are associated with multiple parcels that are separated from the medium range tape nodes by a barrier or a large distance. In the illustrated example, the secondary tape agents 424 and 460 are medium range tape nodes. The medium range tape nodes typically communicate with low and medium power wireless communication protocols (e.g., Bluetooth, LoRa or Wi-Fi). The long-range tape agents 80 typically are adhered to mobile or stationary infrastructure of the wireless communication environment 400. In the illustrated example, the mobile gateway tape node 412 and the stationary gateway tape node 414 are implemented by long-range tape agents 80. The long-range tape agents 80 typically communicate with other nodes using a high power wireless communication protocol (e.g., a cellular data communication protocol). In some examples, the mobile gateway tape node 416 is adhered to a mobile vehicle 412 (e.g., a truck). In these examples, the mobile gateway 416 may be moved to different locations in the environment 400 to assist in connecting other tape agent to the mobile gateway 416. In some examples, the stationary gateway tape node 414 may be attached to a stationary structure (e.g., a wall) in the environment 400 with a known geographic location (e.g., GPS coordinates). In these examples, other tape nodes in the environment can determine their geographic location by querying the gateway tape node 414.

In some examples, in order to conserve power, the tape nodes typically communicate according to a schedule promulgated by the network service 408. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server 404.

Figure 10:
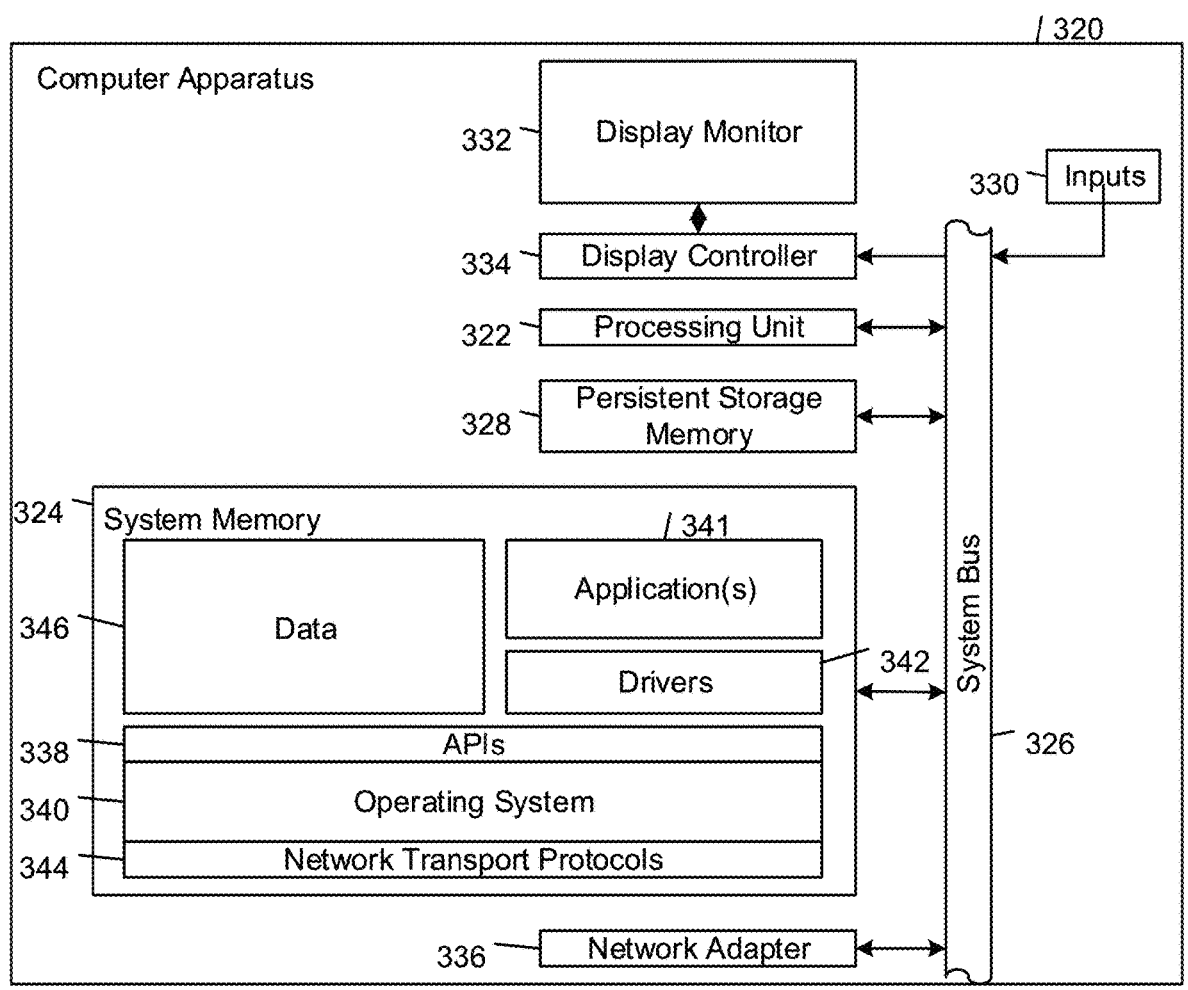
FIG. 10 is a block diagram of an example computer apparatus, according to some embodiments.

FIG. 10 shows an example embodiment of computer apparatus 320 that, either alone or in combination with one or more other computing apparatus, is operable to implement one or more of the computer systems described in this specification. The one or more computer systems may include the mobile gateway 410, an aspect of the mobile gateway 412, the one or more servers 404, the stationary gateway 414, other computer systems in the environment 400 not shown in FIG. 9, or some combination thereof.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments and should not be construed as limitations on the scope of any of the claims. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A plurality of tape agents, comprising:
an autonomous master wireless tape agent comprising a first wireless communications interface type operative to communicate over a wireless communications link with an associated secondary wireless agent, the autonomous master wireless tape agent corresponding to a child node in a wireless agent hierarchy; and
the secondary wireless agent comprising a second wireless communications interface type that has a longer wireless communications range than a wireless communications range of the first wireless communications interface type, the secondary wireless agent corresponding to a parent node in the wireless agent hierarchy, wherein
the master wireless tape agent governs the wireless communications link and traffic between the master wireless tape agent and the secondary wireless agent,
the master wireless tape agent is operative to schedule a designated time slot for each secondary wireless agent transmission, and
the secondary wireless agent is operative to synchronize its transmit and receive timing with that of the master wireless tape agent and respond to requests received from the master wireless tape agent.

2. The plurality of tape agents of claim 1, further comprising a tertiary wireless agent comprising:
the first wireless communications interface type;
the second wireless communications interface type; and
a third wireless communications interface type that has a longer wireless communications range than the second wireless communications interface type,
the tertiary wireless agent corresponding to another parent node in the wireless agent hierarchy, wherein the tertiary wireless agent is associated with the master wireless tape agent and the secondary wireless agent.

3. The plurality of tape agents of claim 2, wherein the master wireless tape agent has unilateral control over the secondary wireless agent and the tertiary wireless agent.

4. The plurality of tape agents of claim 2, wherein a wireless communications interface of each of the secondary wireless agent and the tertiary wireless agent is backwards compatible with the first wireless communications interface type of the master wireless tape agent.

5. The plurality of tape agents of claim 1, wherein the autonomous master wireless tape agent is associated with an asset.

6. The plurality of tape agents of claim 5, wherein the autonomous master wireless tape agent comprises an adhesive tape form factor, is adhered to the asset, and is configured to monitor at least one of a location of the asset, one or more environmental stimuli relevant to the asset, and a condition of the asset.

7. The plurality of tape agents of claim 5, wherein the master wireless tape agent comprises one or more sensors that are operative to generate one or more respective data sets by sensing one or more environmental stimuli relevant to the asset.

8. The plurality of tape agents of claim 7, wherein the master wireless tape agent is operative to transmit the one or more data sets to the associated secondary wireless agent to compute one or more statistics from the one or more data sets.

9. The plurality of tape agents of claim 8, wherein the associated secondary wireless agent is operative to derive one or more analytics based on the computed statistics in accordance with one or more machine learning algorithms for anomaly detection or condition monitoring.

10. The plurality of tape agents of claim 9, wherein the master wireless tape agent is operative to retrieve the one or more analytics from the one or more associated secondary wireless agents.

11. The plurality of tape agents of claim 1, wherein the master wireless tape agent is operative to:
transmit to one or more other agents a request for a resource of a particular type required to complete a task;
receive a reply message from at least one of the one or more other agents that can provide the requested resource;
select one of the at least one other agents to perform the task using the resource; and
receive a confirmation from the selected other agent indicating that the task has been completed.

12. The plurality of tape agents of claim 11, wherein each of the one or more other agents is operative to begin a transmission in a time slot reserved for itself by the master wireless tape agent.

13. The plurality of tape agents of claim 1, wherein the master wireless tape agent is operative to establish a wireless communications link with the secondary wireless agent and, in response to the establishment of the wireless communications link, the secondary agent is operative to expose one or more services that are available from the secondary wireless agent.

14. The plurality of tape agents of claim 1, wherein the secondary wireless agent is operative to begin a transmission in a time slot immediately following a time slot in which the secondary wireless agent was addressed by the master wireless tape agent.

15. The plurality of tape agents of claim 1, wherein the associated secondary wireless agent is a wireless tape agent affixed to infrastructure of physical premises.

16. The plurality of tape agents of claim 1, wherein the associated secondary wireless agent is electrically pluggable into a socket of an electric power supply.

17. The plurality of tape agents of claim 1, wherein
the autonomous master wireless tape agent further comprises:
 a processor;
 a memory; and
 a power source, and
the associated secondary wireless agent further comprises:
 a processor;
 a memory; and
 a power source.

18. A method comprising:
assigning a master agent role to a child wireless tape agent, the child wireless tape agent comprising a first wireless communications interface type; and
assigning a secondary agent role associated with the master agent role to a first parent wireless tape agent, the first parent wireless tape agent comprising the first wireless communication interface type and a second wireless communications interface type that has a longer wireless communications range than the first wireless communications interface type, wherein
the child wireless tape agent having the master agent role governs the wireless communications link and traffic between itself and the first parent wireless tape agent having the associated secondary agent role,
the child wireless tape agent having the master agent role is operative to schedule a designated time slot for each transmission from the first parent wireless tape agent having the associated secondary agent role with the child wireless tape agent, and
the first parent wireless tape agent having the associated secondary agent role is operative to synchronize its transmit and receive timing with that of the child wireless tape agent having the associated master agent role and respond to requests received from the child wireless tape agent having the associated master agent role.

19. A system comprising:
one or more master wireless tape agents, each of the one or more master wireless tape agents comprising a first wireless communications interface type operative to communicate over a wireless communications link;
one or more secondary wireless tape agents, each of the one or more secondary wireless tape agents associated with at least one of the one or more master wireless tape agents and comprising:
 the first wireless communications interface type, and
 a second wireless communications interface type that has a longer wireless communications range than the first wireless communications interface type;
one or more tertiary wireless tape agents, each of the one or more tertiary wireless tape agents associated with at least one of the one or more master wireless tape agents and comprising:
 the first wireless communications interface type,
 the second wireless communications interface type, and
 a third wireless communications interface type that has a longer wireless communications range than the second wireless communications interface type, wherein
each of the one or more master wireless tape agents governs the wireless communications link and traffic between itself and associated secondary wireless tape agents of the one or more secondary wireless tape agents,
each of the one or more master wireless tape agent is operative to schedule a designated time slot for transmissions from the associated secondary wireless tape agents,
each of the one or more secondary wireless tape agents is operative to synchronize its transmit and receive timing with that of the master wireless tape agent and respond to requests received from the master wireless tape agent, and
each of the one or more master wireless tape agents has unilateral control over the associated secondary wireless agents and associated tertiary wireless agents of the one or more tertiary wireless agents.

20. The system of claim 19, further comprising an asset management system, wherein at least one of the one or more tertiary wireless tape agents is configured to communicate with the asset management system using the third wireless communication interface type.

21. The system of claim 19, wherein at least one master wireless tape agent of the one or more master wireless tape agents comprises a flexible adhesive tape platform that is adhered to an asset and the at least one master wireless tape agent is configured to monitor at least one of a location of the asset, a condition of the asset, and one or more environmental stimuli relevant to the asset.

22. The system of claim 19, wherein members of an agent group comprise at least one of the one or more master wireless tape agents, the one or more secondary wireless tape agents, and the one or more tertiary wireless tape agents, and at least one of the one or more master wireless tape agents, the one or more secondary wireless tape agents, and an asset management system are programmed to wake up at scheduled times to ensure that the members of the agent group are correct according to predefined asset instructions.

* * * * *